G. TAYLOR.
HAIRCLOTH WEAVING LOOM.
APPLICATION FILED JULY 19, 1911.

1,192,018.

Patented July 25, 1916.
11 SHEETS—SHEET 4.

Fig. 4.

INVENTOR
GEORGE TAYLOR
BY HIS ATTORNEY
Harry Smith

WITNESSES
H. S. Turner
E. Fullerton

G. TAYLOR.
HAIRCLOTH WEAVING LOOM.
APPLICATION FILED JULY 19, 1911.
1,192,018.
Patented July 25, 1916.
11 SHEETS—SHEET 5.
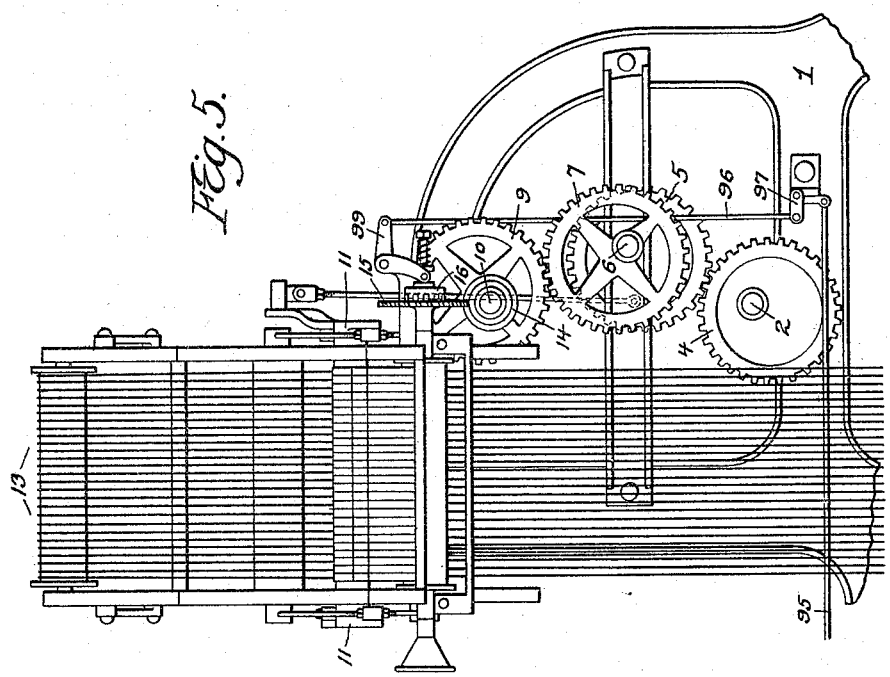
WITNESSES
Hamilton D. Turner
Elsie Fullerton
INVENTOR
GEORGE TAYLOR
BY HIS ATTORNEY
Harry Smith

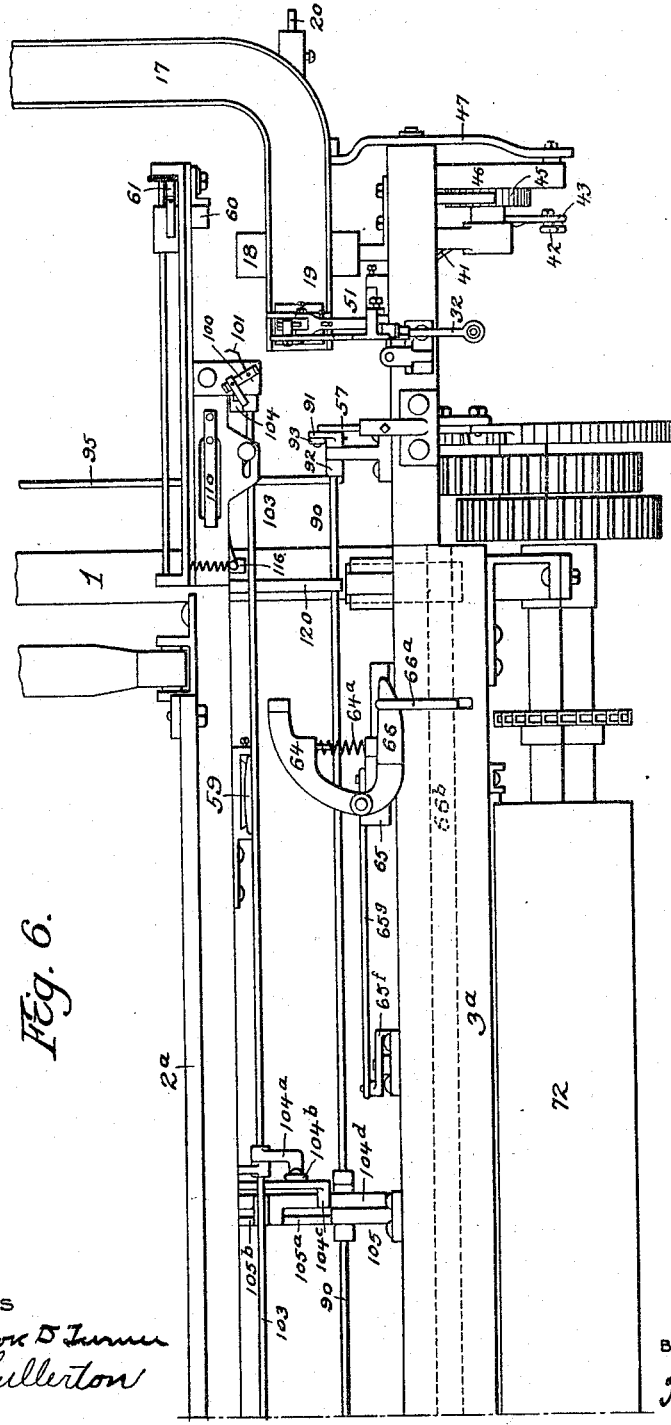

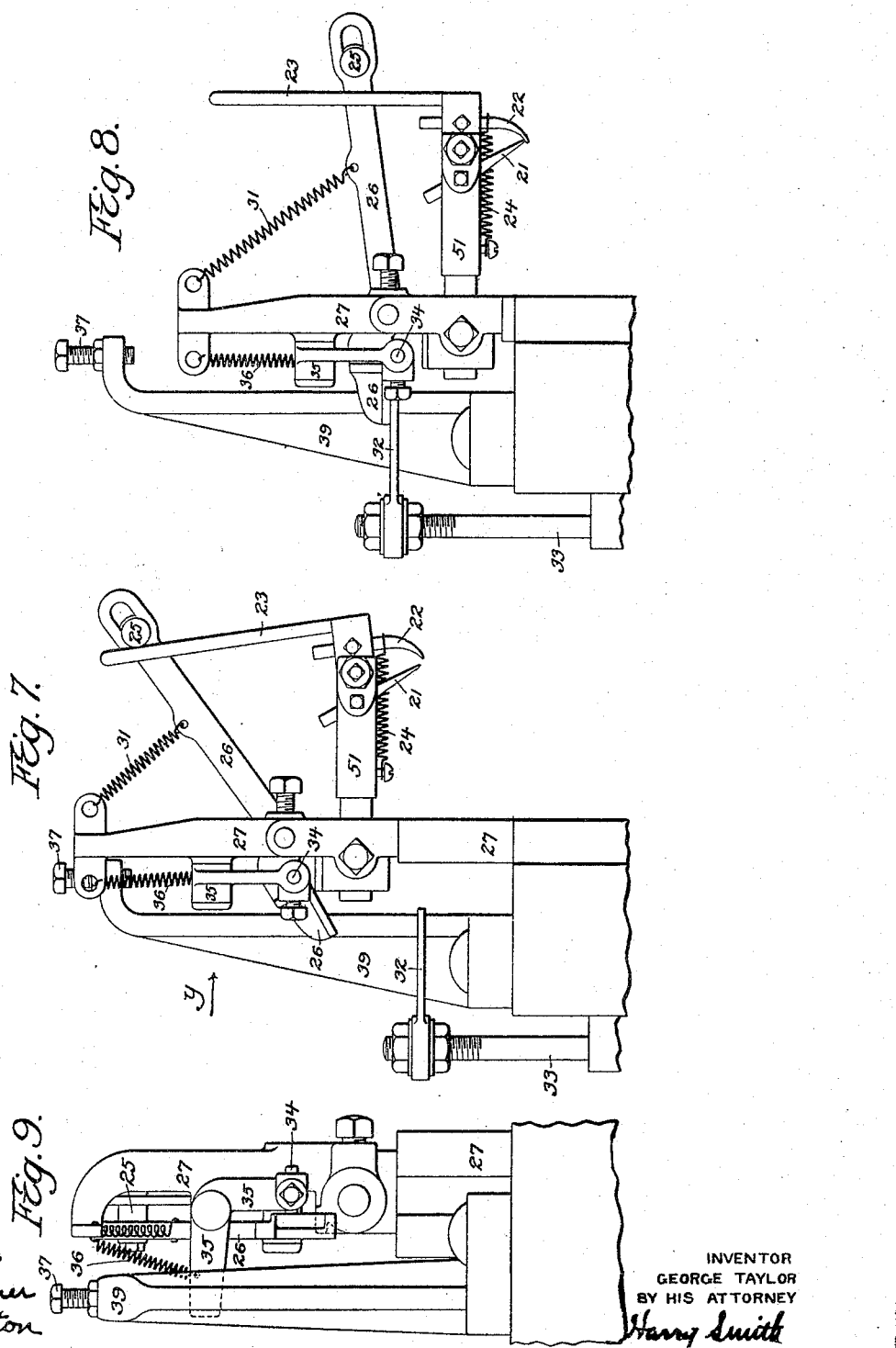

G. TAYLOR.
HAIRCLOTH WEAVING LOOM.
APPLICATION FILED JULY 19, 1911.
1,192,018.
Patented July 25, 1916.
11 SHEETS—SHEET 8.
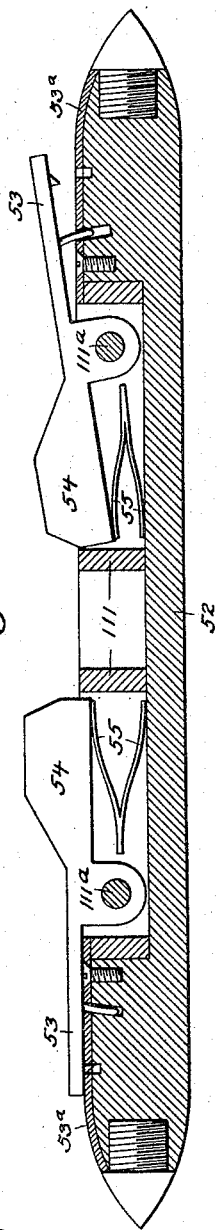
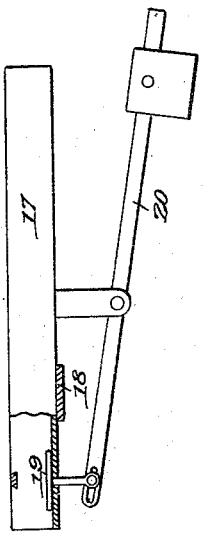
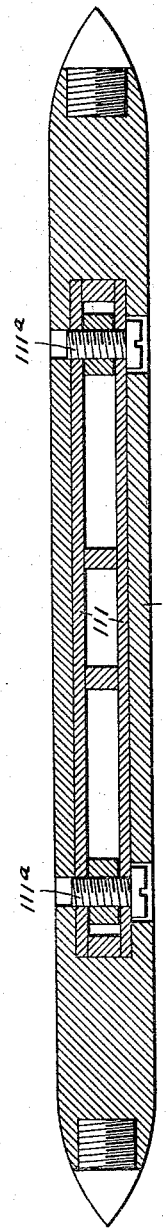
WITNESSES
Hamilton E. Turner
Elsie Fullerton
INVENTOR
GEORGE TAYLOR
BY HIS ATTORNEY
Harry Smith

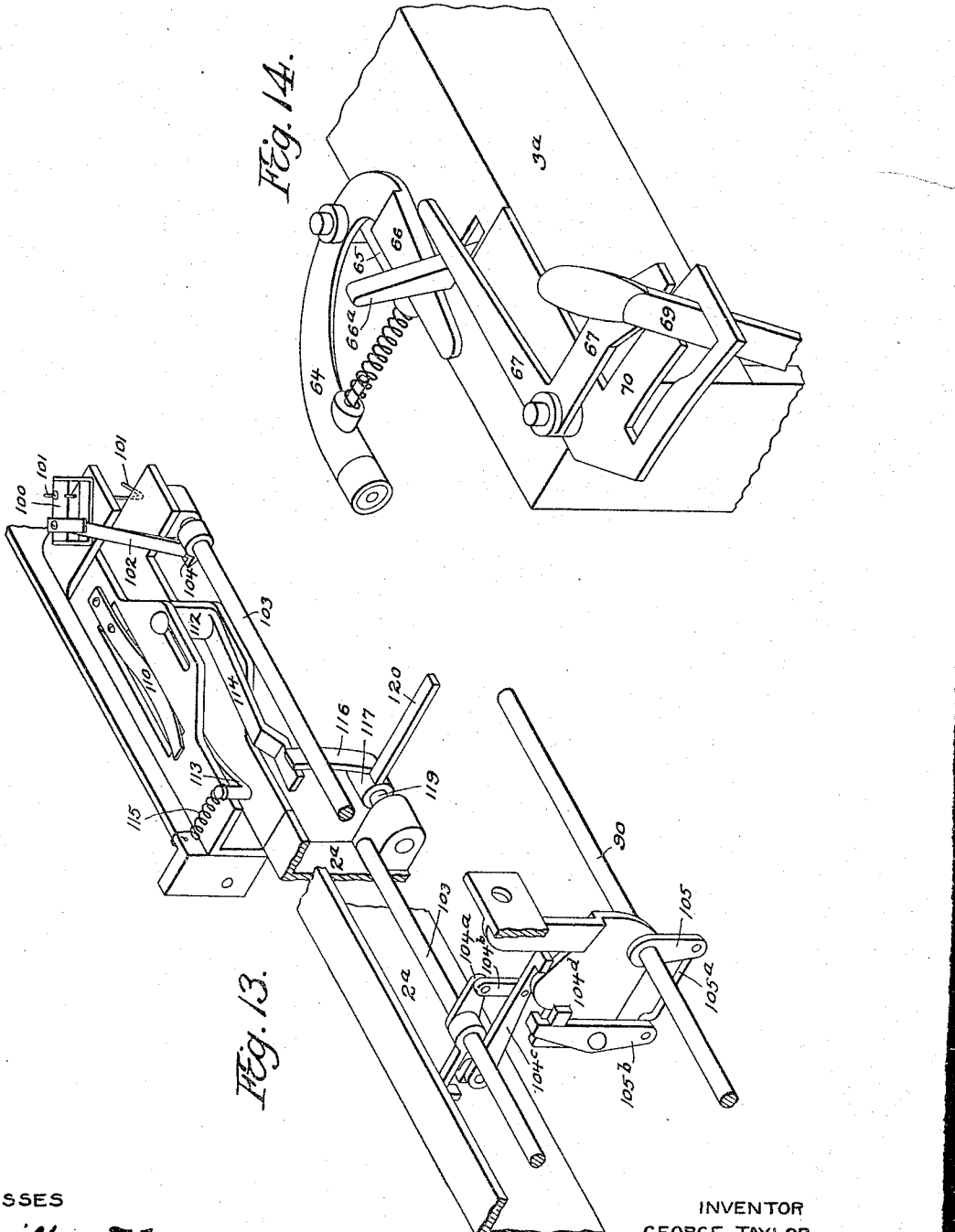

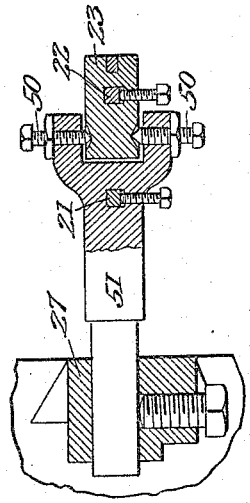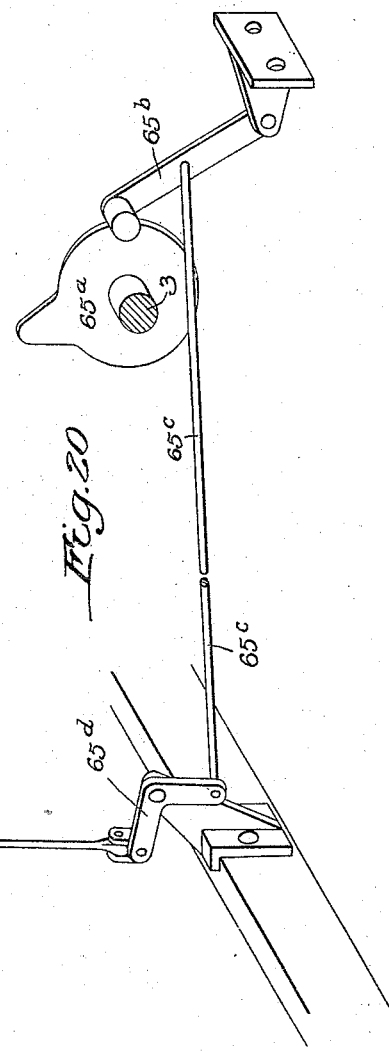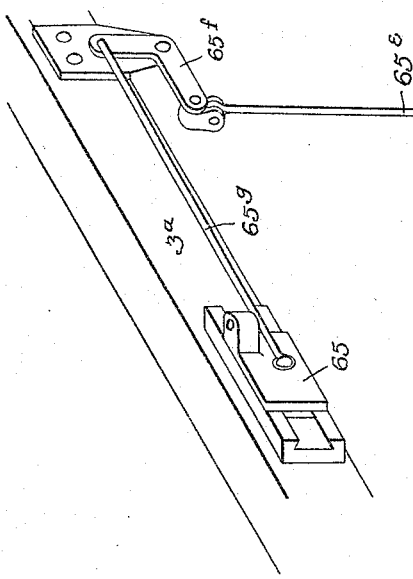

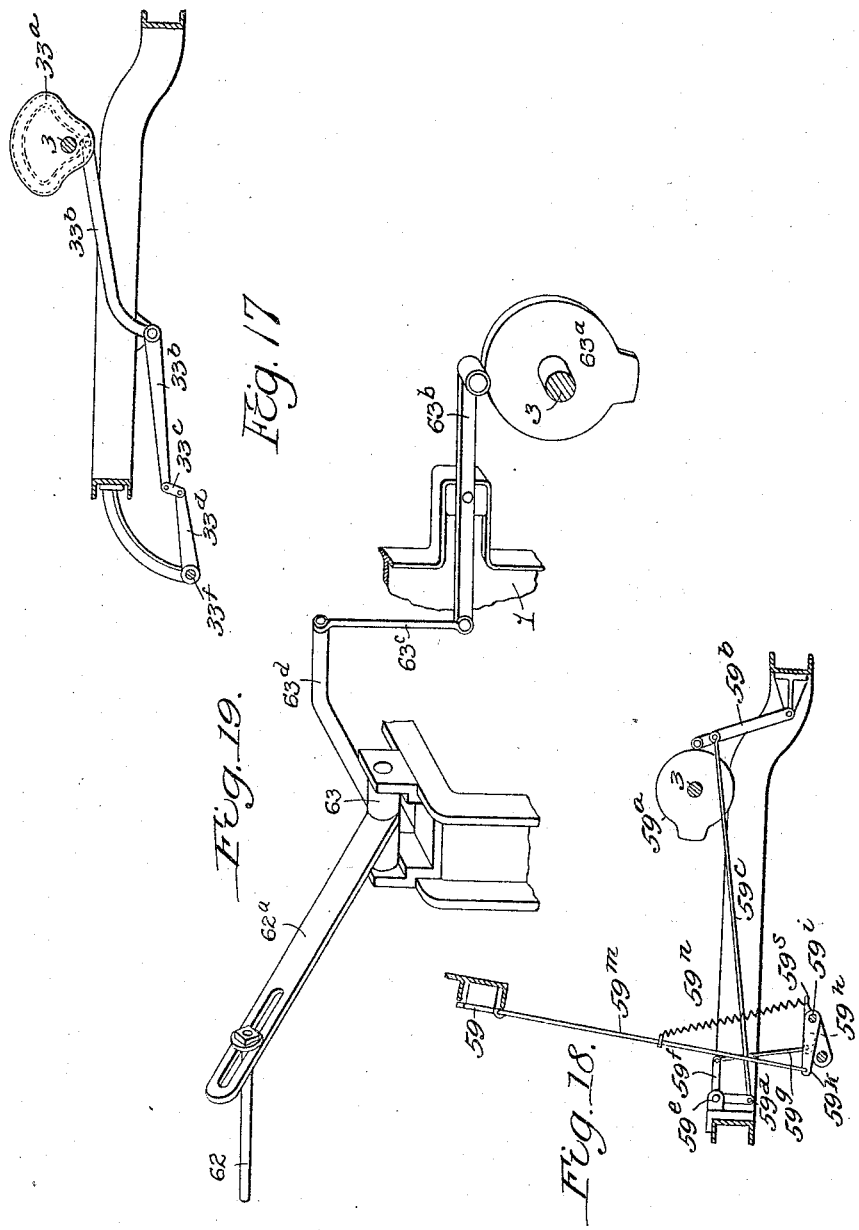

UNITED STATES PATENT OFFICE.

GEORGE TAYLOR, OF PHILADELPHIA, PENNSYLVANIA, ASSIGNOR TO CHARLES H. FELDSTEIN COMPANY, INC., OF PHILADELPHIA, PENNSYLVANIA, A CORPORATION OF PENNSYLVANIA.

HAIRCLOTH-WEAVING LOOM.

1,192,018.

Specification of Letters Patent. Patented July 25, 1916.

Application filed July 19, 1911. Serial No. 639,362.

*To all whom it may concern:*

Be it known that I, GEORGE TAYLOR, a citizen of the United States, residing in Philadelphia, Pennsylvania, have invented certain Improvements in Haircloth-Weaving Looms, of which the following is a specification.

My invention consists of certain improvements in the hair cloth weaving loom for which I obtained Letters Patent of the United States No. 850,806, dated April 16, 1907, the objects of my present invention being to simplify the construction and improve the operation of various elements of the loom, as hereinafter set forth.

Figure 1:
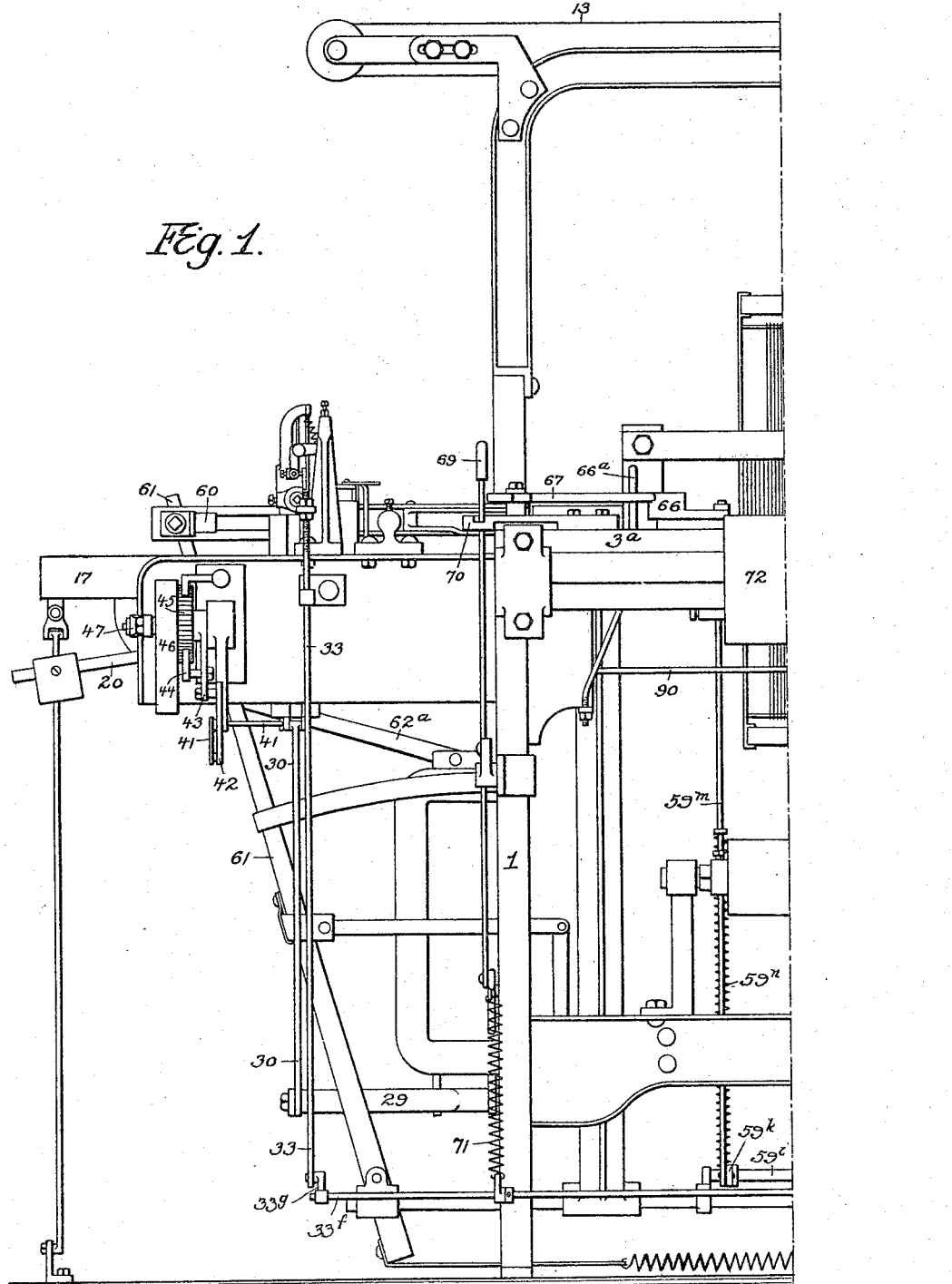
Figure 2:
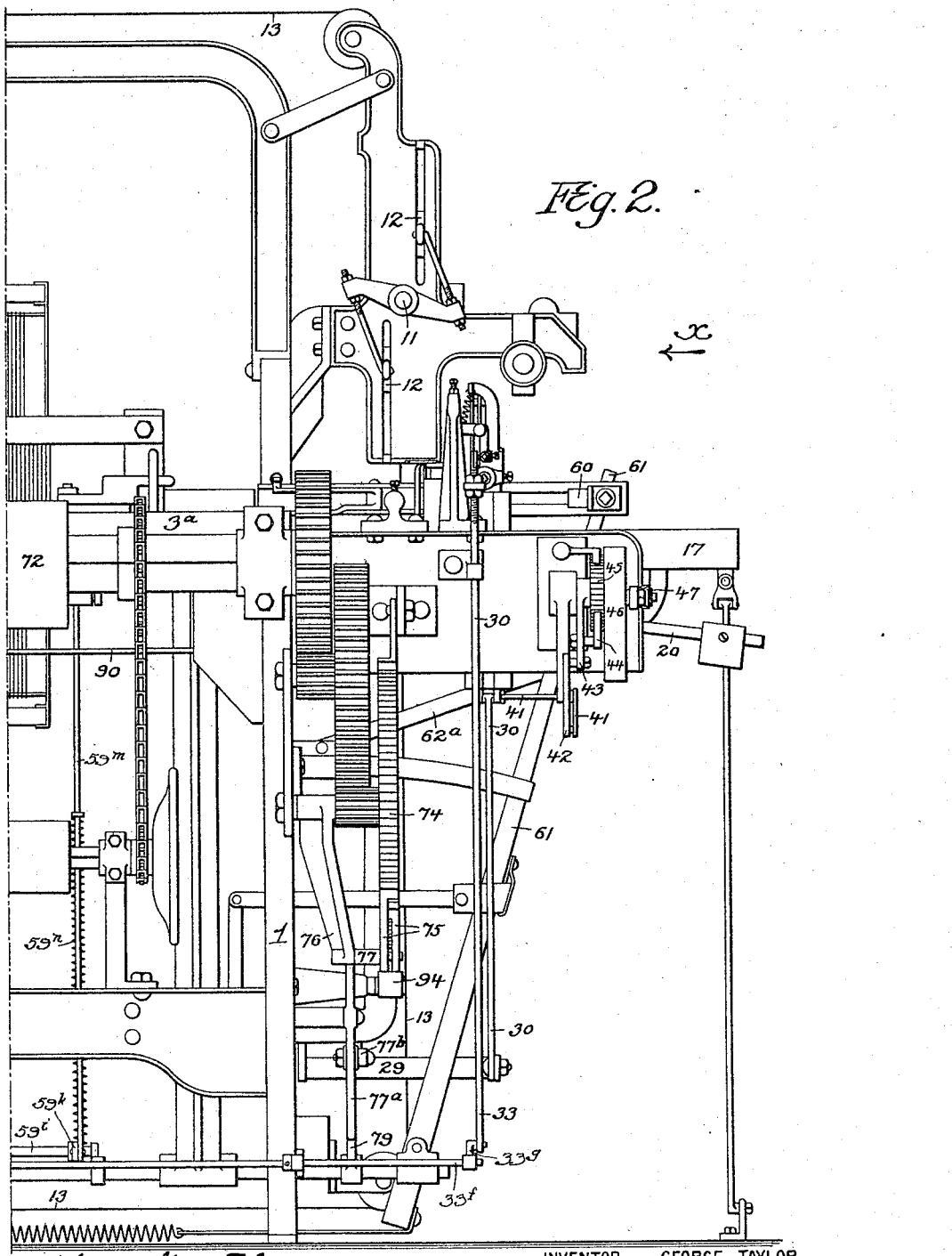
Figure 3:
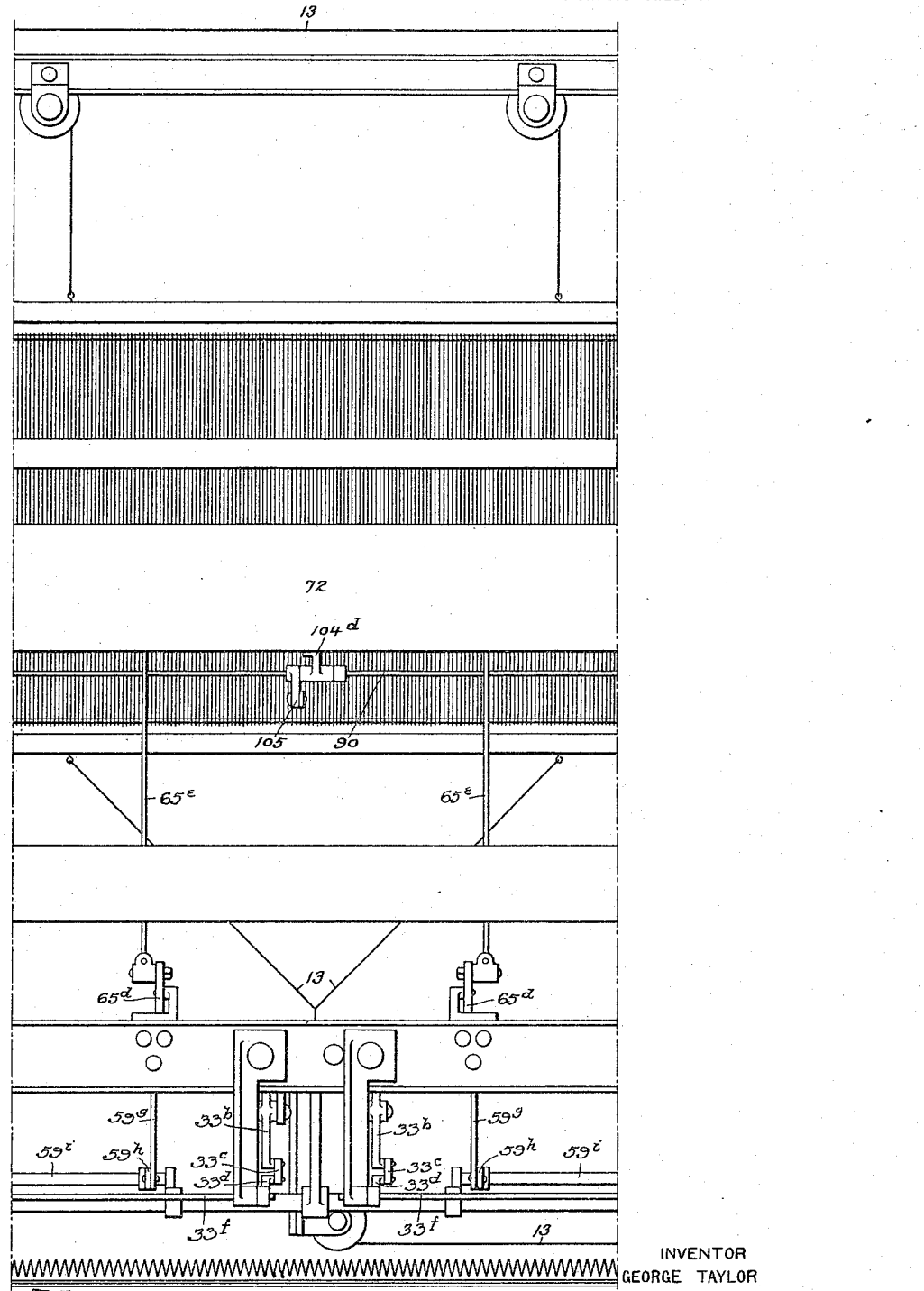

In the accompanying drawings Figure 1 is a front view of the left hand end of the loom; Fig. 2 is a front view of the right hand end of the loom; Fig. 3 is a front view of the central portion of the loom; Fig. 4 is a side view of the lower portion of one end of the loom looking in the direction of the arrow $x$, Fig. 2, certain parts which would otherwise be shown in the distance having been omitted in order to avoid confusion; Fig. 5 is a side view of the upper portion of said end of the loom; Fig. 6 is a plan or top view of part of the right hand end of the loom; Figs. 7 and 8 are end views, on an enlarged scale, of the hair selecting nippers and the parts operating in conjunction therewith; Fig. 9 is a front view of part of the mechanism, looking in the direction of the arrow $y$, Fig. 7; Fig. 10 is a horizontal sectional view of the shuttle; Fig. 11 is a vertical sectional view of the same; Fig. 12 is a diagram illustrating the method of operating the warp threads to prevent lateral displacement of the hair which has just been laid in the shed of warps by the shuttle; Figs. 13 to 16 are views on an enlarged scale illustrating certain parts of the loom not illustrated with sufficient clearness in the remainder of the views, and Figs. 17 to 20 are views illustrating the operating mechanism of certain elements of the loom.

The general weaving mechanism of the loom, that is to say, the means for supplying and shedding the warp threads, for operating the take-up devices, and for operating the lay and pickers, can be varied in many ways without departing from my invention, since the latter, with certain exceptions hereinafter noted, has no reference to the general weaving mechanism but relates especially to the mechanism for moving the hair pan, to the means for opening and closing the hair selecting nippers, to the construction of the shuttle, to means for arresting the operation of the take-up and heddle mechanism in case of a mispick, to means for easing the motion of the shuttle as it approaches the end of its travel, to means for arresting the operation of the loom if the shuttle fails to properly enter the box, and to means for firmly gripping the last inserted hair in the shed of warps after it has left the control of the shuttle so as to prevent further movement of said hair by momentum.

In the drawings, 1 represents the frame of the loom, 2 the crank shaft, $2^a$ the swinging lay, 3 the cam shaft, and $3^a$ the breast beam of the loom, the shafts 2 and 3 being intended to be geared together in the usual way, so that the crank shaft can make two revolutions to each revolution of the cam shaft. At one end of the crank shaft 2 is an eccentric spur wheel 4, which meshes with a similar spur wheel 5 on a shaft 6, the latter being also provided with an eccentrically mounted spur wheel 7, as shown in Figs. 4 and 5, and said spur wheel 7 meshing with a similar eccentric spur wheel 9 on a shaft 10. A crank pin on the spur wheel 5 has suitable connection with the rock shaft 11, whereby reciprocating movement is imparted to the upper and lower bars 12 of the heddle motion, the eccentric gears 4 and 5 being so disposed that this motion is differential, whereby the shed of warps will be quickly closed after the shuttle has passed through the same. The eccentricity of the spur wheels 7 and 9 is the reverse of that of the spur wheels 4 and 5, in order that the shaft 10 may have a uniform movement instead of the differential movement which is imparted to the shaft 6 by reason of said eccentric spur wheels 4 and 5.

The bars 12 are caused to act as usual, upon jacks which are connected to the heddle frames through the medium of cords 13 passing around suitably disposed pulleys, the heddle mechanism being of the "closed shed" type, and each heddle frame is equipped with wires so disposed that the eyes thereon for the reception of the warp threads will be in different planes, as shown in Fig. 12, the purpose of this arrangement being to insure the crossing of certain of the threads over the last inserted hair after the latter has been released by the shuttle and before it is beaten up, as also shown in Fig. 12, whereby the last inserted hair will be firmly gripped by the warp threads and will be prevented from continuing to move by reason of its momentum, after it is free from the control of the shuttle, thus insuring an even selvage on the cloth.

The shaft 10 has a worm 14 (Fig. 5) meshing with a worm wheel 15 which is free to turn on the shaft of the pattern drum of the heddle mechanism but is normally clutched to said shaft by means of the clutch collar 16, the latter being actuated by means to be hereinafter described, so that it will be drawn out of engagement and will arrest the movement of the pattern chain whenever there is a mispick caused by the failure of the selecting nippers to properly engage and lift a hair from the hair pan 17 at either side of the loom. Each of these hair pans is mounted on a slide 18, as shown in Fig. 6, so that it can move back and forth to the extent of the width of the pan and thereby cause the selecting nippers to act upon all portions of the mass of hair contained in the pan, that portion of the mass of hair which is adjacent to the selecting nippers being continually pressed upward by means of a vertically movable supporting plate 19 which is connected to one arm of a weighted lever 20 suitably mounted beneath the hair pan, as shown in Fig. 16, whereby a constant upward pressure of uniform force is imparted to the mass of hair, this method of lifting the mass being preferable to the usual spring-actuated lifter because of its uniformity, whereas the power of the spring gradually diminishes as said spring expands.

The selecting nippers are shown in Figs. 4, 7 and 8, and comprise a fixed nipper 21, and a swinging nipper 22, the latter being mounted upon one arm of a lever 23 and being acted upon by a spring 24 which tends to draw it into contact with the fixed nipper 21, the opening of the nippers being caused by contact with the lever 23 of a projecting pin 25 on a lever 26 pivotally mounted upon a vertically moving slide 27 upon which the nipper-carrying stud 51 is also mounted, whereby said nippers are caused to descend so as to engage a hair in the hair pan and then to rise so as to carry said hair into the path of the gripping jaws on the shuttle.

Rising and falling movement is imparted to the slide 27 by means of a cam 27ª on the cam shaft, this cam acting upon the slide through the medium of a lever 29 and connecting rod 30, as shown in Fig. 4.

The lever 26 is acted upon by a spring 31 which tends to move said lever so as to cause its pin 25 to act upon the lever 23, as shown in Fig. 7, and thereby separate the end of the movable nipper 22 from the end of the fixed nipper 21 and release a hair which has before been clamped between them. The closing of the nippers is effected by the action of the spring 24 as soon as the lever 26 has been moved so as to free the lever 23 from contact with the pin 25, as shown in Fig. 8, and such movement is effected by an arm 32 at the upper end of a vertically reciprocating rod 33, this arm pressing upwardly upon the short arm of the lever 26 and causing depression of the long arm of the same, as shown in said Fig. 8.

Vertical reciprocation of the rod 33 at the proper times is effected by mechanism under control of a suitable cam 33ª on the cam shaft 3 of the loom, this cam acting upon a lever 33ᵇ which is connected by a link 33ᶜ to an arm 33ᵈ on a rock shaft 33ᶠ, as shown in Fig. 17. The rock shaft 33ᶠ has another arm 33ᵍ which is connected to the lower end of the rod 33, as shown in Fig. 4. When the lever 26 has been adjusted to the position shown in Fig. 8 it is retained in this position by means of a pin 34 carried by a bell crank lever 35 hung to the slide 27, this pin engaging with the under side of the short arm of said lever 26 and retaining the same in the position to which it has been adjusted by the arm 32, a spring 36 acting upon the lever 35 and tending constantly to throw the pin 34 into position to engage with said short arm of the lever 26 when the latter has been raised. As the slide 27 rises, however, the lever 35 comes into contact with the lower end of a set screw 37 carried by a standard 39 on the breast beam of the loom, and said lever 35 is thereby moved so as to carry its pin 34 out of engagement with the lever 26 and permit the spring 31 to act upon the latter so as to cause its pin 25 to contact with the lever 23 and thereby move the nipper 22 away from the nipper 21 and release the hair.

The arm 32 is vertically adjustable on the rod 33, and the set screw 37 is vertically adjustable upon the standard 39, in order that the timing of the opening and closing movements of the selector nippers can be very accurately adjusted.

The mechanism for imparting to-and-fro movement to the hair pans is shown in Figs. 1, 2, 4 and 6, and is as follows: A pin 40 on the slide 27 at each end of the loom is adapted to a slot in one arm of a lever 41 which is hung to a suitable projection on the breast beam of the loom, the other arm of this lever being connected by a link 42 to a swinging arm 43 which carries a pawl 44, the latter engaging a ratchet wheel 45 on a short shaft that is also provided with a grooved heart cam 46, the groove of said cam being engaged by an anti-friction roller carried by one end of a link 47 which is suitably guided on the breast beam and is connected at its opposite end to a depending lug on the corresponding hair pan, as shown in Fig. 4.

The heart cam serves to impart uniform movement to the hair pan and the selecting nippers can thus be caused to pick the hairs evenly from the pan, whereas when a crank is used as a means of transmitting movement to said pan such movement is differential, there being a dwell at each end of the throw of the crank and the nippers being consequently caused to pick more hairs from the mass adjacent to the sides of the pan than from the central portion of the mass, an objection which is overcome by the present construction.

The lever 23 which carries the movable selector nipper 22 is mounted upon pointed pivot pins 50 (Fig. 15) carried by the stud 51 which is mounted on the slide 27 and also carries the stationary nipper 21, the use of these pointed pivot pins insuring the free movement of the lever 23 and providing for the ready take-up of any lost motion due to wear and which might otherwise interfere with the precise action of the nippers.

The shuttle 52 (Figs. 10 and 11) has, at each end, a fixed gripping jaw $53^a$ and a movable gripping jaw 53 for engaging the hair and carrying the same through the open shed of warps, each movable gripper 53 having a projecting tail 54 which is normally projected by means of a spring 55 so as to close the gripping jaws. When the shuttle is approaching the limit of its travel across the shuttle race of the lay $2^a$ the tail of the front gripper 53 is, by the forward swing of the lay, brought into contact with a pin 57 (Fig. 6) mounted on the breast beam of the loom and is thereby opened so as to receive the hair drawn into the same by the action of the selecting nippers, the jaw 53 closing as soon as the lay commences to swing backward, so that it will have a firm grip upon the end of the hair before the shuttle is acted upon by the picker mechanism to drive it across the shuttle race in the opposed direction. The movable gripping jaw 53 at the tail of the shuttle is opened to release the hair therefrom as the shuttle approaches the limit of its movement, by a slide 59 which is mounted upon the front of the lay and is raised into the path of the tails of the jaws 53 just before the shuttle reaches the slide, the rising and falling movements of each slide 59 being controlled by a suitable cam $59^a$ on the cam shaft 3 of the loom, so that said movements can be properly timed with reference to the movements of the shuttle.

As shown in Fig. 18, the cam $59^a$ acts upon a pivoted arm $59^b$ which is connected by a rod $59^c$ to an arm $59^d$ on a rock shaft $59^e$ mounted in bearings on one of the beams of the loom frame, said rock shaft having another arm $59^f$ which is connected by a rod $59^g$ to an arm $59^h$ on a rock shaft $59^i$, the latter having another arm $59^k$ which is connected to the slide 59 by a rod $59^m$. A spring $59^n$ is interposed between the rod $59^m$ and an arm $59^s$ on the same rock shaft which carries the arm $59^h$, this spring serving to maintain the parts under tension and hold the anti-friction roller on the arm $59^b$ constantly in contact with the cam $59^a$.

Before the shuttle enters the shuttle box at either end of the lay the picker 60 is caused to move forward in said shuttle box to a limited extent by reason of forward movement imparted to the picker stick 61 by means of a bar 62 on an arm $62^a$ on a rock shaft 63 mounted in a fixed bearing at the side of the loom, rocking movement being imparted to the shaft at suitable intervals by means of an appropriate cam $63^a$ on the shaft 3, said cam acting upon a pivoted arm $63^b$ which is connected by a link $63^c$ to an arm $63^d$ on the rock shaft 63, as shown in Fig. 19. The shuttle is thus arrested before it reaches its final position in the shuttle box, but is moved to such final position by means of a pusher 64 which is mounted upon a slide 65 on the breast beam, as shown in Fig. 6, the shuttle being carried forward into position to engage with this pusher by the forward movement of the lay and the pusher being then actuated so as to push the shuttle to its final position in the shuttle box, the bar 62 having meantime been withdrawn from contact with the picker stick 61. Movement is imparted to the pusher slide 65 at the proper times by means of a cam $65^a$ on the cam shaft 3 acting through the medium of a suitable system of interposed levers and connecting rods. As shown in Fig. 20, this mechanism comprises a pivoted lever $65^b$ which is acted upon by the cam $65^a$ and is connected by a rod $65^c$ to one arm of a bell crank lever $65^d$ whose other arm is connected by a rod $65^e$ to a bell crank lever $65^f$, the latter being connected by a rod $65^g$ to the slide 65.

In case the shuttle sticks in the shed and fails to assume its proper position in front of the pusher 64 it will, as the lay swings forward, contact with the latter and this contact is caused to effect stoppage of the loom in the following manner: The pusher 64 constitutes one arm of a bell crank lever whose other arm 66 is adapted to act upon an arm $66^a$ on a rock shaft $66^b$ within the breast beam, one of these arms $66^a$ acting upon a bell crank lever 67 located between said arm $66^a$ and the knock-off lever 69, as shown in Figs. 1 and 14, and thus causing said lever 67 to push the knock-off lever 69 out of the notch in the plate 70 whereby said knock-off lever is normally held in position when the loom is running, the knock-off lever being connected in the usual manner to the clutch or belt shifting mechanism, so that when it is released from the notch in the plate 70 it will be moved under the action of a spring 71 (Fig. 1) so as to prevent further application of power to the driving shaft of the loom. Between the pusher 64 and a bearing on the slide 65 is interposed a coiled spring 64ª which tends to swing the pusher inwardly from the breast beam and thereby retain the arm 66 normally out of contact with the arm 66ª.

In case the selecting nippers fail to feed the hair to the gripping jaws of the shuttle or the latter fail to properly engage the hair, a mispick is prevented in the following manner: The take-up roller 72 is driven by suitable reducing gears from a shaft 73 which carries a ratchet wheel 74, the latter being engaged by pawls 75 which are pivotally mounted upon an arm 76 hung to the shaft 73 and having vibrating movement imparted to it through the medium of a link 77, a lever 77ª and a link 77ᵇ from an arm 79 on the pivot shaft of the lay, as shown in Fig. 4.

In suitable bearings projecting from the breast beam of the loom is mounted a rock shaft 90 having two arms 91 and 92, the arm 91 being connected by a rod 93 to a pawl lifter 94, and the arm 92 being connected by rods 95 and 96 and bell crank levers 97 and 99 (Figs. 4 and 5) to the clutch collar 16 on the shaft of the pattern drum of the heddle mechanism.

Upon the outer end of each shuttle box is mounted a rock shaft 100 which has two arms 101 and 102 (Fig. 13), the arm 101 lying in the path of a hair as the same is drawn from the hair pan by the gripping jaws of the shuttle. On the front of the lay is mounted a rock shaft 103 provided with two arms 104 and 104ª, the latter being connected by means of a link 104ᵇ to a latch 104ᶜ pivotally mounted on the front of the shuttle race, the forward end of said latch traveling upon the upper surface of a cam plate 104ᵈ mounted on the breast beam of the loom. The rock shaft 90 has an arm 105 which is connected by a rod 105ª to a lever 105ᵇ pivotally mounted on the cam plate 104ᵈ, as shown in Fig. 13.

When a hair is engaged by the gripping jaws of the shuttle it is drawn into contact with the arm 101 and causes the rock shaft 100 to swing so as to carry its arm 102 into the path of the arm 104 on the rock shaft 103 so as to prevent said arm from rising and thereby prevent the latch 104ᶜ from dropping into engagement with the lever 105ᵇ, so that on backward swinging movement of the lay said latch 104ᶜ will travel over the top of said lever 105ᵇ. If, however, the gripping jaws of the shuttle fail to engage a hair the arm 102 of the rock shaft 100 retains its normal position out of the path of the arm 104, consequently, the latter is free to rise and the latch 104ᶜ can follow the surface of the cam plate 104ᵈ and drop into engagement with the lever 105ᵇ so that as the lay swings backward said lever 105ᵇ will be caused to swing upon its pivot and will impart a rocking movement to the shaft 90 to move the pawls 75 out of engagement with the ratchet wheel 74 of the take-up mechanism and at the same time open the clutch which controls the operation of the pattern chain drum of the heddle mechanism, movement both of the take-up mechanism and of the heddle mechanism being thereby arrested. In the event of the latch 104ᶜ failing to engage the lever 105ᵇ the clutch 16 remains in engagement and the pawls 75 continue to engage the teeth of the ratchet wheel 74, so that both the take-up roll and the heddle pattern chair continue in action. If the gripping jaws of the shuttle fail to catch a hair, arrest of movement of the take-up roll and heddle pattern chain is caused, thereby insuring the same shedding of the warps for the next pick.

A stop motion device of this character is much more sensitive in its action than one in which, as in my former patent, the power to move the parts to inoperative position was derived wholly from the pressure of the hair upon the arm with which it was brought into contact.

In the top of the shuttle box is a spring 110, which bears upon the shuttle as the same enters the box and acts as a brake to arrest or retard the movement of the shuttle before it comes into contact with the picker, thereby preventing the rapid destruction of the picker by the blows of the shuttle nose thereon, this result being also aided by the fact that the picker is advanced in the shuttle box when the shuttle first strikes the same and is consequently free to yield instead of having its bearing against a fixed stop at the end of the shuttle box when the shuttle first contacts with the same.

In order that the picker may be advanced to any desired position in the shuttle box the bar 62 which acts upon the picker stick to effect such movement is adjustably mounted upon the arm 62ª, as shown in Fig. 19, and can therefore be moved so as to advance the picker to a greater or less extent, as may be desired.

On reference to Figs. 10 and 11, it will be observed that the wooden body of the shuttle has a metal casing 111 in which the gripping jaws 53 are pivotally mounted by means of the pins 111ª, thereby providing a more substantial mounting for said jaws than where, as in my former loom, the pivot pins engage directly the wooden body of the shuttle. By pivoting the gripping jaws to a metal cage secured to the body of the shuttle the tails of said jaws are better adapted to resist the blows upon them and the rapid wear upon and loosening of the pivotal connections of the jaws are prevented.

To suitable bearings in the front of the shuttle box is pivoted a short rock shaft 112 (Fig. 13) having two arms 113 and 114, the arm 113 being acted upon by a spring 115 which tends to draw it into the shuttle box. When, however, the shuttle properly enters the box the arm 113 is pressed outwardly thereby, and this causes the arm 114 to act upon an arm 116 on a hub 117 mounted so as to rock upon a pin 119 projecting from a lug on the front of the lay, this hub having another arm 120 which is normally in position to engage an arm on the rock shaft 66$^b$ in the breast beam of the loom, so as to operate said rock shaft and cause the release of the lever 69 from the notched plate 70 and thereby arrest the further movement of the loom. If, however, the shuttle properly enters the shuttle box the arm 113 is pressed outwardly thereby, and this causes the arm 114 to so act upon the arm 116 as to depress the arm 120 to such position that it fails to act upon the arm on the rock shaft 66$^b$ and thereby permits the loom to remain in operation. This is the ordinary shuttle protecting device, with the exception that, as usually constructed, the arm 116 is acted upon directly by the arm 113. By the use of the extra arm 114, however, the arm 116 is acted upon at a point closer to the arm 120 so as to render the same more certain in its action.

I claim:

1. The combination, in a hair cloth loom, of heddle mechanism including a pattern drum shaft, a driving shaft, differential gears whereby said heddle mechanism is driven from said driving shaft, and reversely differentiated gears through which uniform rotating movement is imparted to the pattern drum shaft.

2. The combination of the hair selecting nippers, a lever carrying the movable nipper, means for closing the nippers, a second lever acting upon the nipper-carrying lever to open the nippers, means for moving said second lever out of operative position, a locking device for temporarily retaining it in such inoperative position, and means for actuating said locking device.

3. The combination of the hair selecting nippers, a lever carrying the movable nipper, means for closing the nippers, a second lever acting upon the nipper-carrying lever to open the nippers, means for moving said second lever out of operative position, a locking device for temporarily retaining it in such inoperative position, means for moving said locking device to cause it to lock the lever, and means for releasing said locking device when the nippers are to be opened.

4. The combination of the hair selecting nippers, a lever carrying the movable nipper, means for closing the nippers, a second lever acting upon said nipper-carrying lever to open the nippers, a reciprocating arm for moving said second lever to inoperative position, a pin for locking said second lever in such inoperative position, a lever carrying said pin, and a set screw engaging said lever when the latter approaches one extreme of its movement and thereby tripping said lever.

5. The combination, in a hair cloth loom, of the hair pan, a cam whereby uniform movement is imparted to such hair pan in all positions of the same, and means for operating said cam.

6. The combination, of a hair pan, a lifter acting upon the mass of hair therein, and a weighted lever acting on said lifter to raise the same.

In testimony whereof, I have signed my name to this specification, in the presence of two subscribing witnesses.

GEORGE TAYLOR.

Witnesses:
KATE A. BEADLE,
HAMILTON D. TURNER.

Copies of this patent may be obtained for five cents each, by addressing the "Commissioner of Patents, Washington, D. C."